United States Patent
Gutt et al.

(10) Patent No.: US 7,859,455 B2
(45) Date of Patent: Dec. 28, 2010

(54) LOCAL CLOCK FREQUENCY CALIBRATION USING LOW EARTH ORBIT (LEO) SATELLITES

(75) Inventors: Gregory M. Gutt, Ashburn, VA (US); David A. Whelan, Newport Coast, CA (US); Barton G. Ferrell, Troy, IL (US); Robert W. Brumley, Narberth, PA (US); Christopher J. Martens, Creve Coeur, MO (US); Anne T. Haddad, Berwyn, PA (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 12/349,362

(22) Filed: Jan. 6, 2009

(65) Prior Publication Data

US 2010/0171652 A1  Jul. 8, 2010

(51) Int. Cl.
*G01S 19/23* (2010.01)
*G01S 19/25* (2010.01)
*G01S 19/30* (2010.01)

(52) U.S. Cl. .......................... 342/357.62; 342/357.64; 342/357.69

(58) Field of Classification Search ............ 342/342.69, 342/357.16, 357.62, 357.64
See application file for complete search history.

(56) References Cited

U.S. PATENT DOCUMENTS

| 5,365,450 A | 11/1994 | Schuchman et al. |
| 5,510,801 A | 4/1996 | Engelbrecht et al. |
| 5,646,630 A | 7/1997 | Sheynblat et al. |
| 5,812,086 A | 9/1998 | Bertiger et al. |
| 5,812,961 A | 9/1998 | Enge et al. |
| 5,831,574 A | 11/1998 | Krasner |
| 5,841,396 A | 11/1998 | Krasner |
| 5,944,770 A | 8/1999 | Enge et al. |
| 6,178,195 B1 | 1/2001 | Duboraw, III et al. |
| 6,373,432 B1 | 4/2002 | Rabinowitz et al. |

(Continued)

FOREIGN PATENT DOCUMENTS

WO    WO 2005/081011    9/2005

(Continued)

OTHER PUBLICATIONS

GPS World, Centimeter-Accuracy Inddor navigation Using GPS-Like Pseudolites, http://www.gpsworld.com/gpsworld/Design+Challenge/Centimeter-Accuracy-Indoor-Navigation-Using-GPS-Li/ArticleLong/Article/detail/3086, Nov. 1, 2001, 7 pages.

(Continued)

*Primary Examiner*—Thomas H Tarcza
*Assistant Examiner*—Cassi Galt
(74) *Attorney, Agent, or Firm*—Haynes and Boone, LLP

(57) ABSTRACT

Various techniques are provided for calibrating a frequency of a local clock using a satellite signal. In one example, a method of transferring frequency stability from a satellite to a device includes receiving a signal from the satellite. The method also includes determining a code phase from the satellite signal. The method further includes receiving aiding information. In addition, the method includes calibrating a frequency of a local clock of the device using the code phase and the aiding information to substantially synchronize the local clock frequency with a satellite clock frequency.

15 Claims, 5 Drawing Sheets

U.S. PATENT DOCUMENTS

| | | | |
|---|---|---|---|
| 6,389,291 | B1 | 5/2002 | Pande et al. |
| 6,400,314 | B1 | 6/2002 | Krasner |
| 6,526,352 | B1 | 2/2003 | Breed et al. |
| 6,542,823 | B2 | 4/2003 | Garin et al. |
| 6,633,255 | B2 | 10/2003 | Krasner |
| 6,674,398 | B2 | 1/2004 | Murphy |
| 6,717,547 | B2 | 4/2004 | Spilker et al. |
| 6,859,173 | B2 | 2/2005 | Spilker et al. |
| 6,922,546 | B1 * | 7/2005 | Da et al. .................. 455/12.1 |
| RE38,808 | E | 10/2005 | Schuchman et al. |
| 7,030,814 | B2 * | 4/2006 | Stone et al. ................ 342/451 |
| 7,042,392 | B2 | 5/2006 | Whelan et al. |
| 7,372,400 | B2 | 5/2008 | Cohen et al. |
| 2002/0003490 | A1 | 1/2002 | Chang et al. |
| 2002/0082024 | A1 | 6/2002 | Bajijar |
| 2004/0042576 | A1 | 3/2004 | Anderson |
| 2004/0078594 | A1 | 4/2004 | Scott |
| 2005/0156782 | A1 | 7/2005 | Whelan et al. |
| 2005/0159891 | A1 * | 7/2005 | Cohen et al. ................ 701/213 |
| 2007/0236387 | A1 | 10/2007 | Monnerat |
| 2008/0001818 | A1 | 1/2008 | Cohen et al. |
| 2008/0001819 | A1 | 1/2008 | Cohen et al. |
| 2008/0059059 | A1 | 3/2008 | Cohen et al. |
| 2008/0169958 | A1 | 7/2008 | Cohen et al. |
| 2009/0315764 | A1 | 12/2009 | Cohen et al. |
| 2009/0315769 | A1 | 12/2009 | Whelan et al. |

FOREIGN PATENT DOCUMENTS

WO     WO 2008/105778     4/2008

OTHER PUBLICATIONS

NAL—Network Reference—Iridium Subscriber Unit, http://www.nalresearch.com/NetRef_IridiumSubscriberUnit.html, 2006, 2 pages.

Globalstar—Wilipedia, the free encyclopedia, http://en.wikipedia.org/wiki/Globalstar, Jul. 17, 2006, 3 pages.

Iridium (satellite)—Wikipedia, the free encyclopedia, http://en.wikipedia.org/wiki/Iridium_%28satellite%29, Jul. 19, 2006, 4 pages.

Kyriazakos et al., Localization of Mobile Terminals, based on a Hybrid Satellite-assisted and Network-based Techniques, 2000, 5 pages.

Stamoulakatos et al., A Review on Cellular Location Methods Targeting Location Based Services, Proceedings of the IASTED International Conference, Sep. 8-10, 2004, 7 pages.

Laitinen et al., Cellular network optimisation based on mobile location, 2001, 51 pages.

ECC Report 95, Electronic Communications Committee (ECC) within the European Conference of Postal and Telecommunications Administrations (CEPT), Sharing Between MSS Systems Using TDMA and MSS Systems Using CDMA in the Band 1610-1626.5 Mhz, Feb. 2007, 38 pages.

ICAO Technical Manual for Iridium, Aeronautical Mobile Satellite (Route) Service, Draft v1.1, May 19, 2006, 48 pages.

Implementation Manual for IRIDIUM Satellite Communications Service, Draft v.1.0, Feb. 15, 2006, 59 pages.

Chowdhury M.R. Shahriar, Mitigation of Interference from Iridium Satellites by Parametric Estimation and Substraction, Dec. 1, 2006, 111 pages.

Agrawal et al., "GPS: Location-tracking technology", Computer, IEEE Service Center, Mar. 1, 2002, pp. 92-94.

Fossa et al., Department of Electrical and Computer Engineering, An Overview of the Iridium Low Earth Orbit (Leo) Satellite System, 1998 IEEE, pp. 152-159.

* cited by examiner

LOCAL CLOCK FREQUENCY CALIBRATION USING LOW EARTH ORBIT (LEO) SATELLITES

TECHNICAL FIELD

The present disclosure relates generally to satellite systems and, more particularly, to frequency calibration using satellite systems.

BACKGROUND

Many types of handheld electronic devices—such as cell phones, personal digital assistants (PDAs), Global Positioning System (GPS) receivers, or other radio receivers—can be used to provide a number of location based services. For example, a shopper in a mall may be able to receive information on and directions to stores near her having a sale on a particular item for which she is searching based on the device, e.g., a cell phone, "knowing" her current location inside the mall. Or, she may be able to shop with friends who can mutually keep track of each other's locations, or any number of other endless possibilities may exist based on the devices' being able to accurately locate their own positions, in other words, to accurately navigate.

To use the cell phone example, the provision of location based services may depend on the cell phone having the ability to make use of navigation and timing signals provided by various existing satellite navigation systems, such as GPS. In many situations where the satellite signals may be occluded, however, these satellite systems typically do not provide sufficiently satisfactory system performance, e.g., signal power, to enable reliable location based services. For example, navigation satellite signals may suffer extreme attenuation inside buildings, such as in the shopping mall example given above, and other high-blockage environments, e.g., locations surrounded by building structures. In addition, navigation satellite signals may be subject to other effects, such as rain fade; multipath distortion, e.g., around tall buildings; jamming, e.g., in military contexts; and attenuation through deep foliage.

Some location based service systems and navigation systems have attempted to address indoor navigation deficiencies by the use of various approaches, for example, inertial navigation systems, specialized beacons, and highly sensitive GPS systems. Inertial navigation systems, however, drift and are expensive. Beacons require specialized fixed assets that are expensive and not standardized, thus having only specialized utility. Sensitive GPS systems generally do not perform to user expectations due to their continuing inability to reliably overcome the weakness of the GPS signals in indoor environments. Other navigation approaches based, for example, on cellular telephone or television signals typically lack vertical navigation information.

As a result, there is a need for improving the sensitivity of navigation signal, e.g. GPS signal, reception for handheld devices, such as cell phones, PDAs, GPS navigators, or other portable radio receivers so that indoor location based services and navigation can be reliably provided. In addition, there is a need for providing such navigation signal reception sensitivity within the narrow constraints (e.g., limited volume, weight, and power dissipation requirements) of handheld devices.

SUMMARY

In accordance with one embodiment, a method of transferring frequency stability from a satellite to a device includes receiving a signal from the satellite; determining a code phase from the satellite signal; receiving aiding information; and calibrating a frequency of a local clock of the device using the code phase and the aiding information to substantially synchronize the local clock frequency with a satellite clock frequency.

In accordance with another embodiment, a receiver unit includes an antenna adapted to receive a signal from a satellite; a local clock; an analog-to-digital (A/D) converter adapted to sample data from a time transfer structure message in the satellite signal; a memory adapted to store aiding information; and a computer adapted to determine a code phase using the sampled data and determine a frequency correction for the local clock using the code phase and the aiding information to substantially synchronize the local clock frequency with a clock frequency of the satellite.

In accordance with another embodiment, a method of receiving a Global Positioning System (GPS) signal in attenuated environments includes detecting a frame structure of a low earth orbit (LEO) satellite signal; aligning a local clock to the frame structure; generating a plurality of time estimates respectively separated according to the frame structure; providing respective ones of the time estimates to respective ones of a plurality of parallel correlators; time-aligning the parallel correlators using the time estimates; and using a time estimate from the time-aligned correlators to lock on to the GPS signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

Figure 1:
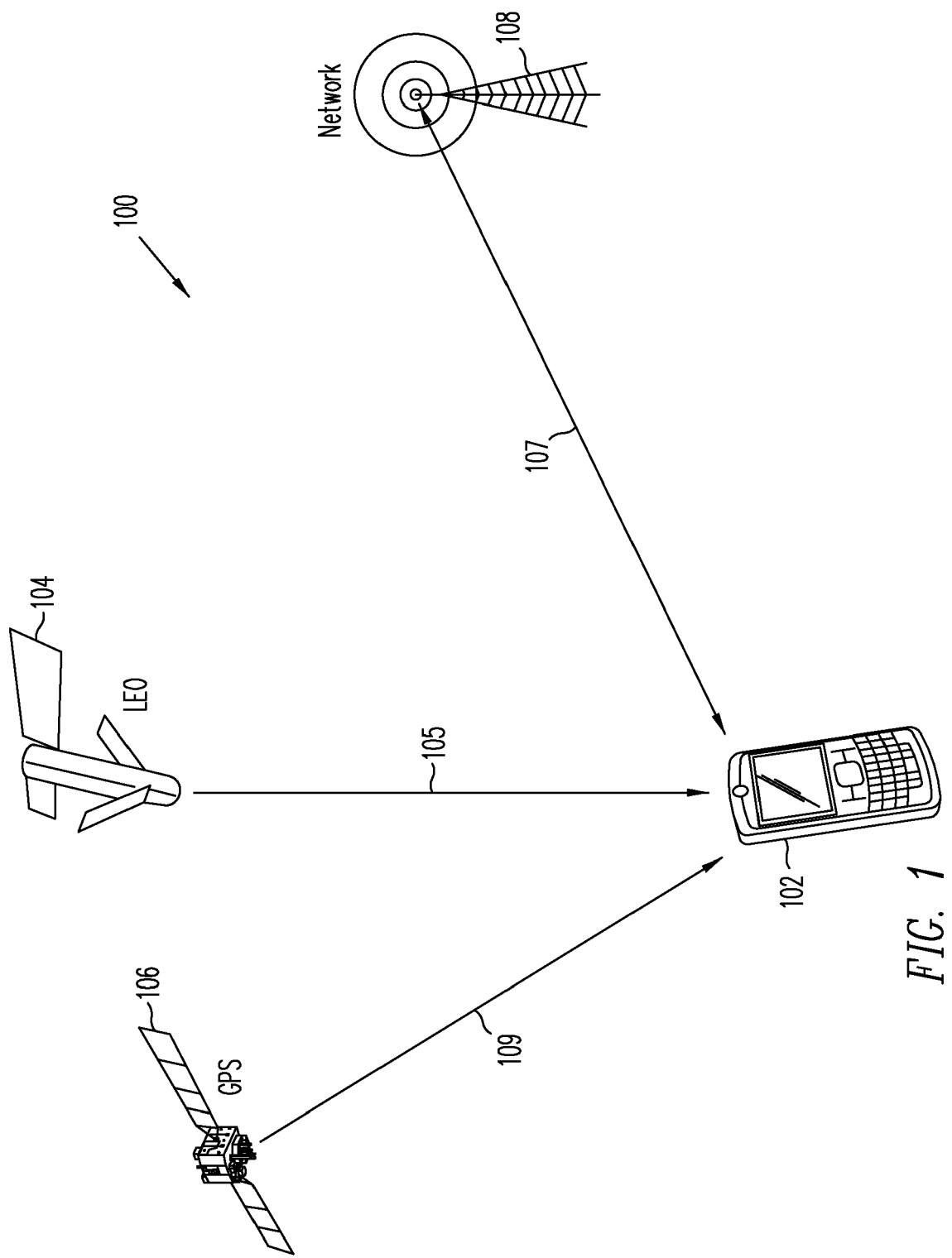
FIG. 1 is a pictorial diagram illustrating an overview of a navigation system that is able to perform in occluded or jammed environments according to an embodiment of the present invention.

In general, embodiments of the present invention enable small, handheld devices, such as cell phones, to transfer the frequency stability of satellite frequency generators to a handheld device even in environments—such as indoors—where a navigation satellite signal may be so attenuated that the device cannot demodulate it. Thus, embodiments may confer the ability to calibrate local oscillator frequency of a portable user device using a communications satellite signal, thereby improving the sensitivity of the portable device, e.g., a cell phone, a Global Positioning System (GPS) receiver, or any other type of radio receiver and enabling the detection of navigation satellite, e.g., GPS, signals in occluded or jammed environments.

In accordance with an embodiment, a system employing satellites, e.g., low earth orbit (LEO) satellites, may be used to augment receiver units, e.g., cell phones or other compact devices, so that they may provide location based services even in heavily attenuated, occluded or jammed environments. Navigation systems according to one or more embodiments may function, despite fundamentally weak signals received from existing sources such as GPS satellites, by improving the sensitivity of receiver units.

Signals from certain satellites, e.g., communication satellites, are generally more powerful than signals from other satellites, e.g., positioning system satellites, such as GPS. For example, a satellite system whose signals are more powerful than GPS signals is the LEO satellite constellation Iridium. In one embodiment, the Iridium satellites broadcast a unique absolute timing signal (also referred to as "time transfer structure signal") in the form of a pseudorandom code (also referred to as pseudorandom number (PN) code) that repeats periodically. The structure of this code allows for a user device to lock onto it even in heavily attenuated or occluded environments—e.g., indoors or where the GPS signal is potentially jammed by a competing signal in a commercial scenario, or where the GPS signal is intentionally jammed by an enemy in, for example, a military scenario—where the receiver unit is able to receive the Iridium signal but unable to receive the GPS signal due to the lower power of the GPS signal and the attenuation of the environment. For Iridium satellites the structure of the repeatable pseudorandom code allows the receiver unit 102 to lock onto the pseudorandom code even in heavily attenuated environments, e.g., up to −45 dB attenuation at the antenna, approximately −15 dB beyond where most GPS receivers fail to receive. By combining the code phase with additional information (e.g., orbit information, approximate time, and approximate location) provided by a network, such as a cellular network, an internet network, or WiFi, the code phase can be converted to absolute time with a precision of approximately 1 to 10 microseconds. Once precise timing is achieved, the receiver unit can use this information to align GPS correlators that can then successfully receive (i.e., detect) the GPS signal.

Once the signal is detected, the receiver unit, e.g., cell phone, can use Doppler measurements of Iridium satellites in conjunction with known broadcast frequency information and precise orbit information to estimate the rate-of-change in frequency. Because the receiver unit has range and orbit information, Doppler effects can be removed. The remaining frequency signal is, in principle, the carrier frequency of the satellite. The carrier synthesizer of a satellite is generally of a much higher quality than is possible to provide in portable equipment such as a cell phone, i.e., the receiver unit. Thus, in accordance with certain embodiments described herein, it is possible to transfer the frequency stability of the satellite carrier frequency to a local clock of the receiver unit. Using Iridium, a frequency transfer system that has been reduced to practice has been able to achieve frequency transfer with results of about 40 Hz (Hertz) in 1.6 GHz (Gigahertz) or approximately 0.025 parts per million (ppm) frequency stability.

According to one or more embodiments, the stable frequency derived from the satellite signals is sufficiently accurate to facilitate aligning system correlators in a receiver unit to focus in very narrow periods of time. When multiple system correlators are used without the benefit of a precise time reference in occluded or jammed environments, the correlation process is computationally burdened by searching over large time periods and the receiver unit may not be able to perform under such conditions. However, with the transfer of stable frequency (e.g., having an accuracy of approximately 0.025 ppm) a receiver unit (or user device) may better receive and track navigation signals from a positioning system such as GPS by aligning the receiver unit's system correlators even in highly attenuated or jammed environments. Thus, embodiments of the present invention may aid GPS or any other positioning satellite system in heavily attenuated or jammed environments.

FIG. 1 illustrates navigation system 100 that is able to perform in occluded or jammed environments, in accordance with one embodiment. As shown in FIG. 1, navigation system 100 may include a receiver unit 102 (e.g., a cellular telephone), that is configured to receive signal 109 from navigation system satellite 106. Signal 109 may include a Global Positioning System signal (e.g., protected and/or unprotected GPS signal) from conventional navigation satellites. Also, receiver unit 102 may be configured to receive signal 105 from satellite 104, which may be a LEO satellite. Signal 105 received from LEO satellite 104 may comprise a precision time signal coded on satellite 104. Receiver unit 102 also may be configured to receive signal 107 from network 108. Network 108, for example, may include any combination of a cellular network, an Internet network, a WiFi network, or other networks. Signal 107 received through network 108 may include additional aiding information, for example, orbit information associated with satellite 104, an approximate location of receiver unit 102, an approximate range between satellite 104 and receiver unit 102 (e.g., within approximately 3000 meters (m)), approximate time information (e.g., approximate time within about 5 seconds of UTC), timing bias information associated with satellite 104 (e.g., satellite clock offsets), and/or other information.

According to one or more embodiments, navigation system satellite 106 may be a part of an integrated high-performance navigation and communication system such as an iGPS (indoor Global Positioning System) system. According to another embodiment, satellite 106 may be a part of any other positioning satellite system, including for example, the Global Orbiting Navigation System (Glonass).

In one example, LEO satellite 104 may be a communications satellite, which may be implemented by a satellite of an existing communication system (e.g., Iridium or Globalstar satellite systems). In one example where an Iridium satellite is used to implement satellite 104, flight computers of the Iridium satellite may be reprogrammed with appropriate software to facilitate the handling of navigation signals. In another example where a Globalstar communication satellite is used to implement satellite 104, the satellite bent pipe architecture permits ground equipment to be upgraded to support a variety of new signal formats. In embodiments where satellite 104 is implemented as a LEO communications satellite, the LEO communications satellite may be configured to support communication signals as well as navigation signals. In this regard, such navigation signals may be implemented to account for various factors such as multipath rejection, ranging accuracy, cross-correlation, resistance to jamming and interference, and security, including selective access, anti-spoofing, and low probability of interception.

Receiver unit 102 may be implemented with appropriate hardware and/or software to receive and decode signals from a variety of space and terrestrial ranging sources (i.e., satellites 104, 106, and network 108) to perform navigation. Such signals may include, for example, satellite broadcasts from GPS (or any other positioning system (e.g., Glonass), LEO (e.g., Iridium or Globalstar satellite systems), Wide Area Augmentation System (WAAS), European Geostationary Navigation Overlay Service (EGNOS), Multi-functional Satellite Augmentation System (MSAS), Galileo, Quasi-Zenith Satellite System (QZSS), and/or Mobile Satellite Ventures (MSV) satellites. Such signals may also include terrestrial broadcasts from network 108, which may include cellular networks, TV networks, Internet networks, WiFi, WiMAX, National Vehicle Infrastructure Integration (VII) nodes, and other appropriate sources. Receiver unit 102 may be implemented in accordance with various embodiments set forth in U.S. Pat. No. 7,372,400, issued May 13, 2008, and which is incorporated herein by reference.

Receiver unit 102 may be further configured to receive and perform navigation using broadcast signals of other space and terrestrial ranging sources as may be desired in particular embodiments. In addition, receiver unit 102 may be configured with an inertial measurement unit (IMU) implemented, for example, as a micro-electromechanical system (MEMS) device to provide jamming protection. Receiver unit 102 may also be implemented in any desired configuration as may be appropriate for particular applications. For example, in various embodiments, receiver unit 102 may be implemented as a cellular telephone (cell phone), an iGPS receiver, a handheld navigation device, a vehicle-based navigation device, an aircraft-based navigation device, or other type of device. In one embodiment, the position of receiver unit 102 may correspond to the position of a user.

Figure 2:
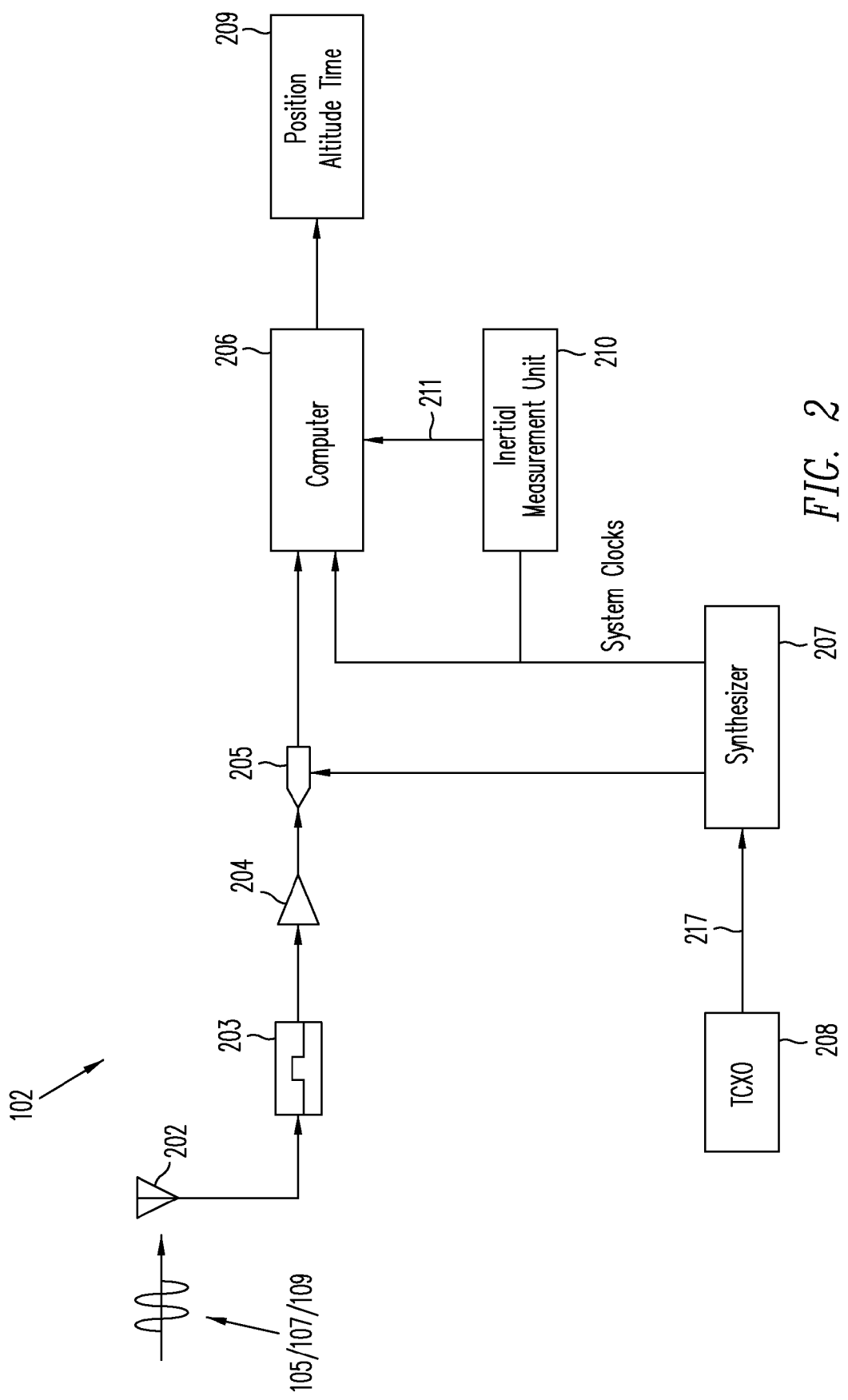
FIG. 2 is a block diagram of a receiver unit according to an embodiment of the present invention.

FIG. 2 shows an example of a system block diagram for receiver unit 102 according to one embodiment. As seen in FIG. 2, receiver unit 102 may include a multi-frequency antenna 202 adapted to receive satellite signals 105, 107, and/or 109 previously described herein. Antenna 202 may be coupled to one or more pre-select filters 203, which may feed an amplifier 204 connected to an analog to digital (A/D) converter 205. The sampling rate of A/D converter 205 may be appropriately determined such that receiver unit 102 may downconvert to baseband all bands of interest. Synthesizer 207 may receive a signal 217 from a temperature controlled crystal oscillator (TCXO) 208. Synthesizer 207 may be coupled to A/D converter 205, inertial measurement unit 210, and computer 206, which may comprise a memory and a processor. Computer 206 may receive raw measurements 211 from inertial measurement unit 210 as well as input from synthesizer 207 and A/D converter 205 to produce an output 209, which may include position, altitude, and time.

System correlators may be implemented by the processor of computer 206. For example, in locations where receiver unit 102 is occluded or jammed and cannot receive a detectable signal 109 (e.g., a GPS signal) from navigation system satellite 106, receiver unit 102 may send a message to network 108 requesting assistance. Network 108 may then determine additional aiding information to provide to receiver unit 102. Receiver unit 102 may then use signal 107, comprising additional aiding information obtained through network 108, in combination with signal 105, comprising a time transfer structure signal from LEO satellite 104, to align its system correlators. Alignment of system correlators may enable receiver unit 102 to detect navigation system signal 109 so that reception from navigation system satellite 106 is improved enough for receiver unit 102 to be able to perform navigation even in occluded or jammed environments.

Figure 3:
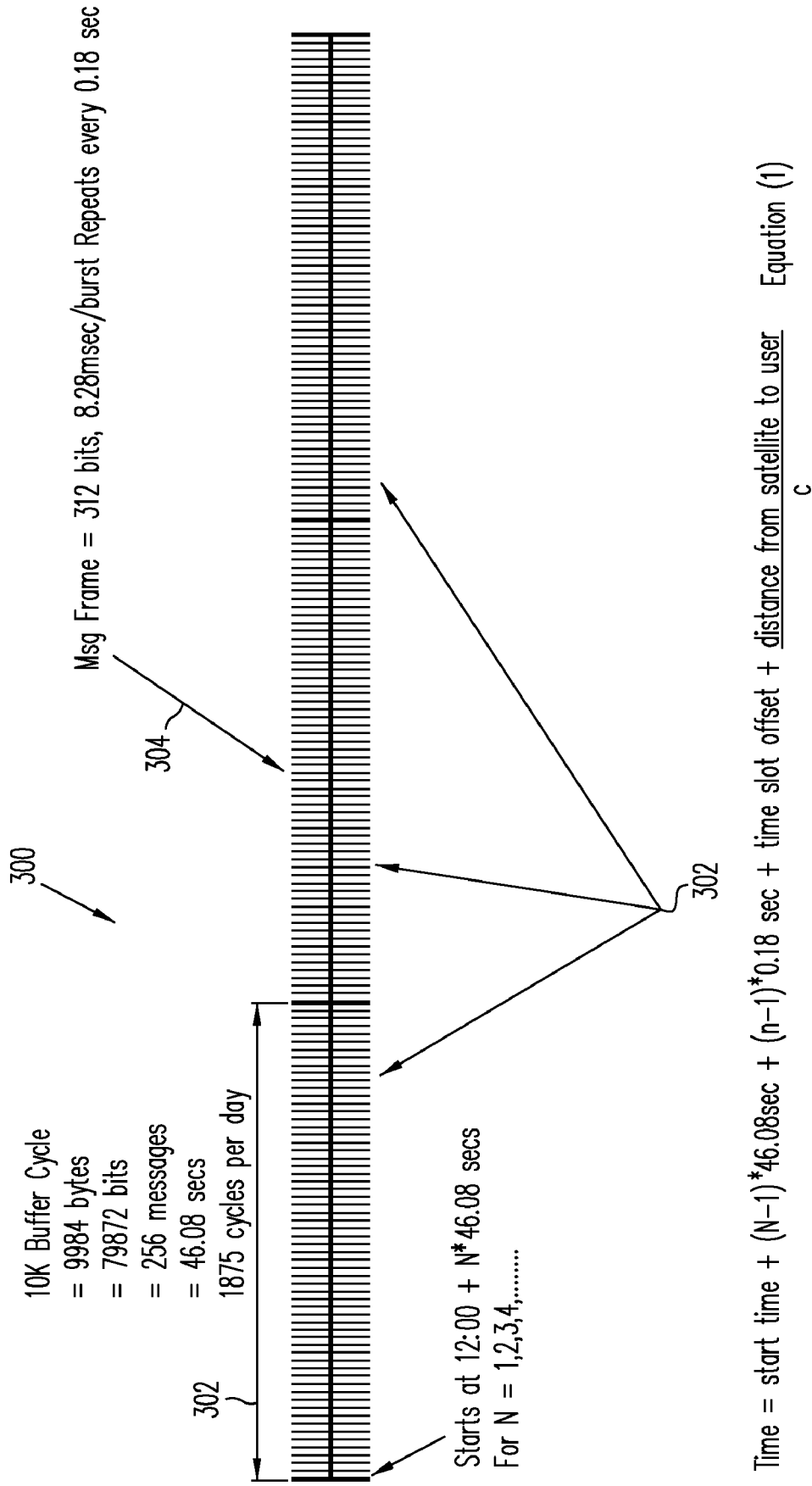
FIG. 3 is a signal timing diagram that illustrates a time transfer structure signal of a low earth orbit (LEO) satellite according to an embodiment of the present invention.

FIG. 3 illustrates a time transfer structure signal of a LEO satellite, e.g., satellite 104, according to one embodiment. The time transfer structure signal of FIG. 3 may be implemented for use in navigation system 100 of FIG. 1, for example, or it may also be used, for example, in network synchronization, or in other systems or applications. In the example illustrated by FIG. 3, signal 300 may be included in signal 105 from satellite 104 in an Iridium satellite system.

As shown in FIG. 3, signal 300 may comprise successive 10 kilobyte (K) buffer cycles 302 that are repeatedly broadcast by each satellite 104 in a satellite system. Each 10K buffer cycle 302 may include, for example, 9984 bytes, or equivalently 79872 bits. Thus each 10K buffer cycle 302 may include 256 message frames 304 each having 312 bits. Each satellite 104 may transmit 1875 buffer cycles per day, each lasting approximately 46.08 seconds.

Message frames 304 may be provided at intervals of 0.18 seconds. The 312 bits of message frame 304 may include, for example, 312 time transfer bits, 312 payload bits selected for other system tasks, and/or or 312 bits including time transfer bits and payload bits. The time transfer structure message bits provide one of 256 possible time transfer structure messages and may last approximately 8.28 msec of the 180 msec message frame 304. A time transfer structure message burst (i.e., the 8.28 msec of data) may be offset by a specified "time slot" within the message frame 304. The payload bits provide communication data (e.g., telephone calls) which occur with a voice update every 90 milliseconds. The additional bits may be predefined by satellite 104 for use in various other purposes as may be desired in particular applications. All bits of message frame 304 may be used to detect the edge of message frame 304.

Each time transfer structure message may have its own unique pseudorandom code (or other unique code) such that each time transfer structure message is distinguished from the others. The unique code may be, for example, a pseudorandom code, an orthogonal code, or other binary code with the property that cross-correlation between distinct members of the code set is relatively low (e.g., less than approximately 0.5) and auto-correlation for each individual code set member is relatively high (e.g., greater than approximately 0.5).

For example, if there are 256 or more distinct time transfer structure messages, each of the 256 message frames 304 in a buffer cycle 302 may have its own unique time transfer structure message within the buffer cycle 302. In one embodiment, an Iridium satellite 104 may broadcast a pseudorandom code that repeats approximately every 46.08 seconds. In another embodiment, a coarse timing code may be followed by a pseudorandom code. The coarse timing code may comprise a repeating segment of pure carrier frequency which may be easily detected by receiver unit 102 for use with various operations, such as determining Doppler shift. The pseudorandom code may then be used to determine absolute time to high accuracy, but may be more difficult for receiver unit 102 to detect than the coarse timing code. In this regard, the coarse timing code may be used by receiver unit 102 to efficiently determine the approximate times at which the pseudorandom code is expected to be received.

The precise time that a time transfer structure message arrives at receiver unit 102 can be computed (e.g., by computer 206) using equation (1), shown in FIG. 3 and here:

$$\text{Time}=\text{start time}+(N-1)*46.08 \text{ sec}+(n-1)*0.18 \text{ sec}+ \text{time slot offset}+(\text{distance from satellite to user})/c \quad (1)$$

In equation (1), "Time" is the precise time of arrival of a time transfer structure message that is to be calculated, and "start time" represents a known start time of the satellite 104 broadcasting of buffer cycles 302. The start time value represented in equation (1) may be, for example, 12:00 am or some other clock time at a defined date and may be delivered to receiver unit 102 via data link or otherwise stored in a memory of receiver unit 102, such as the memory of computer 206. Also in equation (1), c is the speed of light.

In equation (1), "N", which may represent the current 10K buffer cycle 302, is the number of times the buffer cycles 302 have repeated since the start time. In equation (1), for example, it is assumed that 256 unique messages of each buffer cycle repeat every 46.08 seconds. In one embodiment, a local clock of receiver unit 102 may have enough accuracy—for example, if receiver unit 102 has a clock synchronized to network 108—to determine the value of N.

In equation (1), "n" (also referred to as the "code phase") represents the ordinal number (in this example, the first through the 256th) of the message frame 304 (each message frame lasting 0.18 seconds) whose time transfer structure message (e.g., in an 8.28 msec burst) has been identified through its unique pseudorandom code. In the example of equation (1), the LEO satellite 104 broadcasts a time transfer structure message every 0.18 seconds and each time transfer structure message comprises one of 256 unique pseudorandom codes. After a buffer cycle 302 of 256 message frames 304, the pseudorandom code repeats from the beginning. Therefore, in this example, "n" is a number between 1 and 256. Thus, if receiver unit 102 can identify which time transfer structure message is received, then the code phase "n" may be determined. For example, receiver unit 102 may perform a correlation to identify which time transfer structure message was received in the presence of noise.

In equation (1), "time slot offset" accounts for the amount of time within the 0.18 second long message frames 304 before a time transfer structure message (e.g., an 8.28 msec burst) occurs. There may be several time slots (e.g., 8.28 msec bursts may be accommodated by as many as about 21 time slots in a 0.18 sec frame) allocated within each message frame. The use of time slots may allow, for example, for time division multiplexing or time division multiple access (TDMA) of the satellite broadcast frequency. Time slots may be provided by satellite 104; time slots may be measured by a reference station; and time slots may be fixed or predictable as part of the satellite service. The "time slot offset" also may be used to compensate for any timing bias in system 100; for example, it may compensate for measured errors in the clock of satellite 104 or known time slot changes in the transmission sequence. Receiver unit 102 may know which time slot to use through network 108.

In equation (1), "distance from satellite to user" represents the distance between satellite 104 and receiver unit 102. This distance may be computed using an orbit model for satellite 104, suitably accurate knowledge of the position of receiver unit 102, and approximate time (as an input to a satellite orbit model). In one embodiment, in order to obtain an accuracy within about 10 microseconds in the computation of "Time" in equation (1), the distance estimate can be accurate to about 3000 m, which may equate to about 20,000 m of horizontal accuracy on the ground. This level of positioning may be easily achieved, for example, via cell network techniques, using cell network 108. After the distance from satellite 104 to receiver unit 102 is determined, it is then divided by the speed of light (also referred to as "c") to provide a time correction in equation (1) for the time required for signal 105 to propagate from satellite 104 to receiver unit 102.

The additional aiding information needed, e.g., orbit model, approximate time, and approximate receiver unit 102 location may be delivered via data link, e.g., through network 108. Additionally, simple beam coverage methods may be employed to determine the position of receiver unit 102 based on the knowledge of which LEO satellite beam (e.g., from satellite 104) the user is presently located in and the recent beam time history. Numerous other methods of approximate positioning of receiver unit 102 may also be suitably employed. In one embodiment, satellite orbit information (ephemeredes) for satellite 104 may include information such as the location of satellite 104 within a constellation of satellites at various points in time and other information that can be used by receiver unit 102 to accurately obtain clock values from satellite 104. In this embodiment, network 108 may easily determine the location of receiver unit 102 (or the user) within less than one kilometer. The distance from satellite to user—also called range—may be accurate to about 3 kilometers. The approximate time of receiver unit 102 may be used with the orbit information to determine the location and, hence, range of satellite 104.

Figure 4:
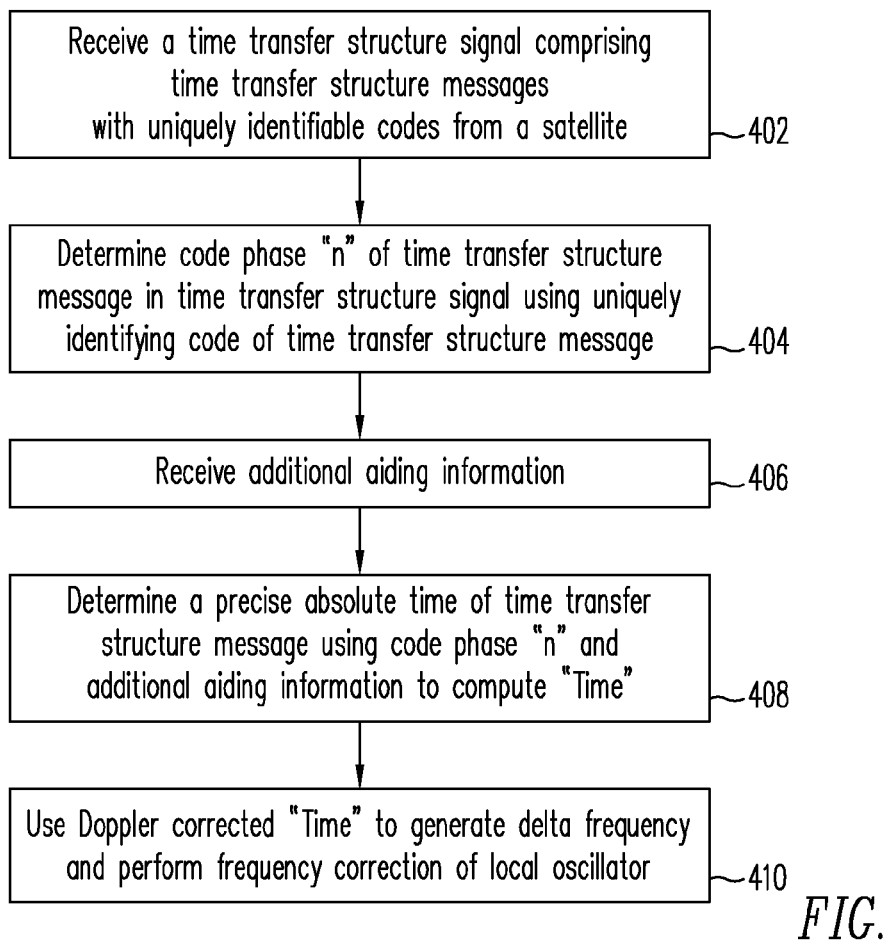
FIG. 4 is a flow chart illustrating a method of obtaining precise frequency transfer from a satellite according to an embodiment of the present invention.

FIG. 4 illustrates a method of transferring frequency stability from a satellite—such as satellite 104—to a small, portable, handheld device—such as receiver unit 102—according to one embodiment. For example, once the "Time" of a time transfer structure message is determined, e.g., using equation (1), the time transfer signal can be locked onto by receiver unit 102. Then, once a Doppler correction for the relative motion between satellite 104 and receiver unit 102 is applied to the time transfer signal, receiver unit 102 can generate a local clock signal whose frequency stability effectively approaches the accuracy of that of satellite 104.

At step 402, receiver unit 102 receives signal 105, which may comprise a time transfer structure signal 300 as shown in FIG. 3, from satellite 104. As previously described, the time transfer structure signal 300 may comprise a pseudorandom code and/or coarse timing code followed by a pseudorandom code.

At step 404, the code phase, or "n" of equation (1), of time transfer structure signal 300 may be determined by receiver unit 102 using a method described below with reference to FIG. 5, for example. Briefly, receiver unit 102 may perform a correlation to identify which time transfer structure message was received even in the presence of noise. For example, if noise is present, random bits may be received, then the time transfer structure message, then random bits again. Thus, the time transfer structure message may be corrupted by noise and may include corrupted bit values. Assuming that a long message is sent, for example, a 1000 bit message, the bits may be compared to the bits received. If, for example 980 bits are correct, then the next 1000 bits are compared and so on until a peak is reached. A peak is reached when the number of correct bits is greater than the average number. In the example of sending a message of 1000 bits, if the peak is, for example, 600, then it is determined that that is the correct message. Thus, the message is received and statistically determined in the presence of noise at a particular time.

At step 406, receiver unit 102 may receive additional aiding information such as the starting time of the time transfer structure signal (represented by "start time" in equation (1)), the expected carrier frequency of the time transfer structure signal transmissions, a model of the LEO satellite orbits, and time bias correction information described above in connection with FIG. 3 and equation (1). Receiver unit 102 may receive the additional aiding information via network 108 for example, or from satellite 104 in a case where, for example, receiver unit 102 is moving in and out of attenuated environments. In general, the update rate of the additional aiding information may be low and could, for example, be stored for 24 hours or longer. Additionally, approximate time (e.g., within several seconds of accuracy) may be provided through network 108 or by a local clock of receiver unit 102.

At step 408, receiver unit 102 has enough information to determine a precise absolute time, for example, by computing "Time" according to equation (1), which may match the internal clock time kept by the LEO satellite 104 (e.g., an Iridium satellite). For example, each Iridium satellite maintains an internal clock that is monitored and maintained to an accuracy of within 10 microseconds with respect to Coordinated Universal Time (UTC, Fr. Temps Universel Coordonné, also known as Greenwich Mean Time or Zulu time) without clock drift. Thus, the time transfer structure signal broadcast by Iridium satellites may be accurately tied to UTC time within approximately 10 microseconds. Thus, by determining the internal clock time of Iridium satellites (e.g., by computing "Time" from equation (1)), absolute time information accurate to within about 10 microseconds may be obtained at receiver unit 102.

At step 410, receiver unit 102 may compensate for Doppler shift of signal 105, i.e., change in frequency of signal 105 produced by relative motion between the satellite 104 and receiver unit 102. For example, using the "Time" values computed at step 408 and compensating for Doppler shift, receiver unit 102 may synthesize frequency with stability of approximately 0.025 ppm. Doppler frequency shift may be calculated using the following equation (2):

$$\text{Doppler frequency shift} = -(\text{range rate}) \times \text{frequency}/c \quad (2)$$

where "c" is the speed of light, "frequency" is the frequency of signal 105 at the satellite 104, and "range rate" is the change in range or distance between the locations of receiver unit 102 and satellite 104 per unit of time or, equivalently, relative velocity between satellite and receiver unit. Range rate can be computed by receiver unit 102, for example, using a model of the LEO satellite orbits received at step 406 via network 108 and the receiver unit 102 along with the approximate location which is also received or determined at step 406.

The demodulated signal data which correspond to the "Time" or correlation peak values may be used by receiver unit 102 to generate a measured frequency of signal 105 from satellite 104. In one exemplary embodiment, a frequency deviation, $\Delta f$, may be measured by examining the phase of the demodulated time transfer signal 105. The phase of demodulated time transfer signal 105 may be the angle between the "in phase" (I) and "quadrature" (Q) components of demodulated signal 105. In this example, bits defining the code phase ("n") may be defined in successive groups of two to interleave the code phase. Perfect correlation with respect to a particular code phase and perfect demodulation of the demodulated time transfer signal 105 may result in both I and Q signals being identical because the interleaved code phases are identical (i.e., the phase angle is constant, which may be described by saying that the slope of the phase angle is zero). On the other hand, a frequency deviation caused by an error in the local oscillator and/or Doppler estimate (i.e., imperfect demodulation) results in a nonzero slope in the phase angle response to the frequency deviation. Measuring the slope of the phase angle response to the frequency deviation may provide the measured frequency deviation, $\Delta f$. To ensure accurate demodulation of signal 105, equation (2) may be used to account for the Doppler frequency shift resulting from the relative motion between satellite 104 and receiver unit 102. If the proper Doppler correction is applied to the demodulation process, any measured frequency deviation may be the result only of a frequency mismatch between the local clock oscillator in receiver unit 102 and the precision clock oscillator aboard satellite 104. Since the precision oscillator aboard satellite 104 has a known frequency ($f_{known}$), the true local frequency ($f_{local}$) can be found using equation (3):

$$f_{local} = f_{known} + \Delta f \quad (3)$$

A number of possible methods for frequency alignment exist in either hardware or software. One hardware method, for example, aligns frequency by generating an oscillator control voltage which is proportional to the phase/frequency error (e.g., $\Delta f$) measured by the demodulation process. This voltage may then act as a negative feedback input signal to a voltage controlled oscillator (VCO), which may be, for example, included in unit 102. The output frequency of the VCO may then be reapplied to the demodulation process resulting in a new error $\Delta f_{new}$. This feedback process may continue until the input error $\Delta f_{new}$ is sufficiently small so that the modified local frequency ($f_{local-new}$) is sufficiently close to the reference frequency $f_{known}$ to achieve the desired accuracy of the local clock frequency. The process may be implemented using, for example, a phase locked loop (PLL).

After the processing described above, $f_{local-new}$ is now a corrected, or calibrated, local clock frequency that may have virtually the same frequency stability and accuracy as that of satellite signal 105. In other words the frequency stability and accuracy of LEO satellite 104 has been transferred to handheld receiver unit 102.

Figure 5:
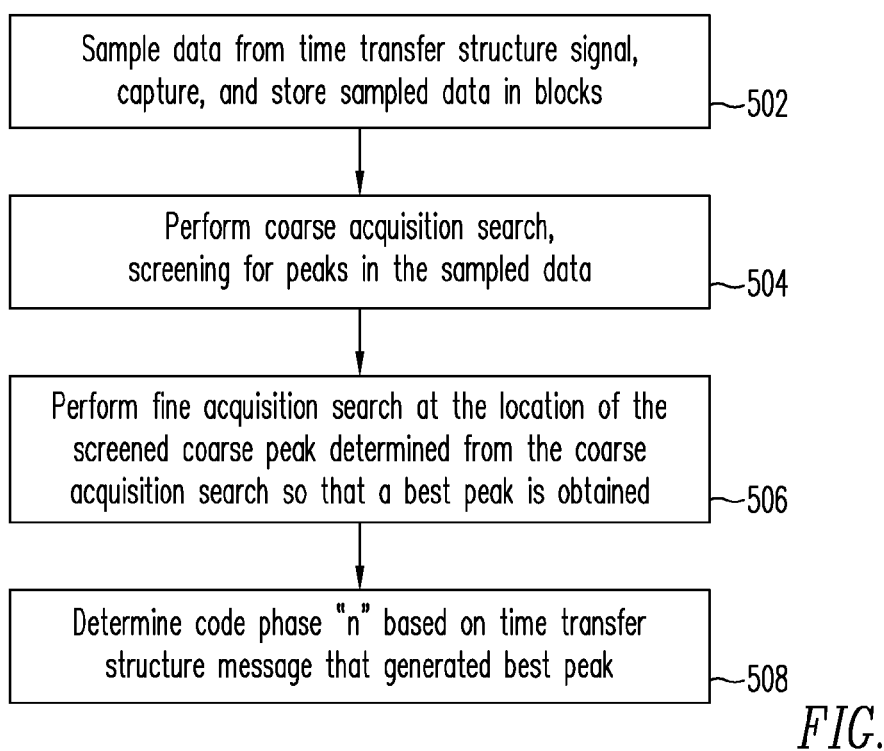
FIG. 5 is a flow chart illustrating a method for determining the code phase of a received satellite signal according to an embodiment of the present invention.

FIG. 5 illustrates a method for determining the code phase of a received satellite signal (e.g., the time transfer structure signal 300 transmitted from an Iridium satellite in signal 105) according to one embodiment. The method of FIG. 5 may be performed in step 404 of the method of FIG. 4, e.g., after time transfer structure signal 300 comprising data—such as time transfer structure messages—is received from Iridium satellite 104 and collected over the entire Iridium frequency band with receiver unit 102 having (as shown in FIG. 2) antenna 202, pre-select filters 203, amplifier 204, and A/D converter 205 for converting the signal to a demodulated baseband signal.

At step 502, the demodulated data may be sampled by A/D converter 205, for example, at 50 Msamples (Mega-samples or million samples) per second, captured (e.g., in a register of A/D converter 205), and stored in memory (e.g., a memory of computer 206) in appropriate blocks, for example, in blocks containing one millisecond of samples of data.

At step 504, a coarse acquisition search of the sampled data may be performed. In this example, approximately 8.28 msec (e.g., corresponding to the length of a time transfer structure message burst, see FIG. 3) of data may be selected for detailed processing. Doppler of the captured data may be estimated using a known orbit model and an estimated time. The data may be digitally demodulated with sine and cosine functions based on a known (or estimated) frequency sub-band and access. Demodulation also may include the estimated Doppler corrected frequency. The data may then be decimated by a factor, for example, of approximately 111. A Fast Fourier Transform (FFT) may be used on the decimated data to determine the highest peak and associated frequency. The associated frequency also may be used to further improve demodulation in the next iteration. Demodulation in general may yield a DC result, however, imperfect Doppler estimates generally generate a low frequency component. After processing each block of sampled data, the following one-millisecond block of sampled data may be processed, i.e., the process may be repeated. Then, the processed data may be screened for peaks, performing consistency checks. For example, peaks should be separated by "n"×180 milliseconds (i.e., the 0.18 second message frame length, see FIG. 3).

At step 506, after peaks are screened, fine acquisition may be performed at the location of the coarse peak+180 milliseconds−0.5×window. The window represents a range in time where the code phase "n" may be expected to be found. For example, the sampled data may be correlated against the 256 pseudorandom code time transfer structure messages; the highest correlation peak may then be recorded; and the time step may be incremented by a certain number of microseconds. This process may then be repeated for the duration of the window.

At step 508, the code phase "n" may be determined by the receiver unit 102 by knowing which message generated the best peak and knowing the relative time when the data was captured. Once the code phase "n" is determined, the method of FIG. 5 ends.

Once the local oscillator or clock of receiver unit 102 has been frequency corrected to match the stability and accuracy of the satellite 104 frequency synthesizer according to the techniques described above of one or more embodiments, the local clock frequency, having the transferred frequency stability and accuracy, may be used in numerous applications such as network synchronization or as an aid to a positioning system such as GPS, iGPS (indoor GPS), or aGPS (assisted GPS).

Figure 6:
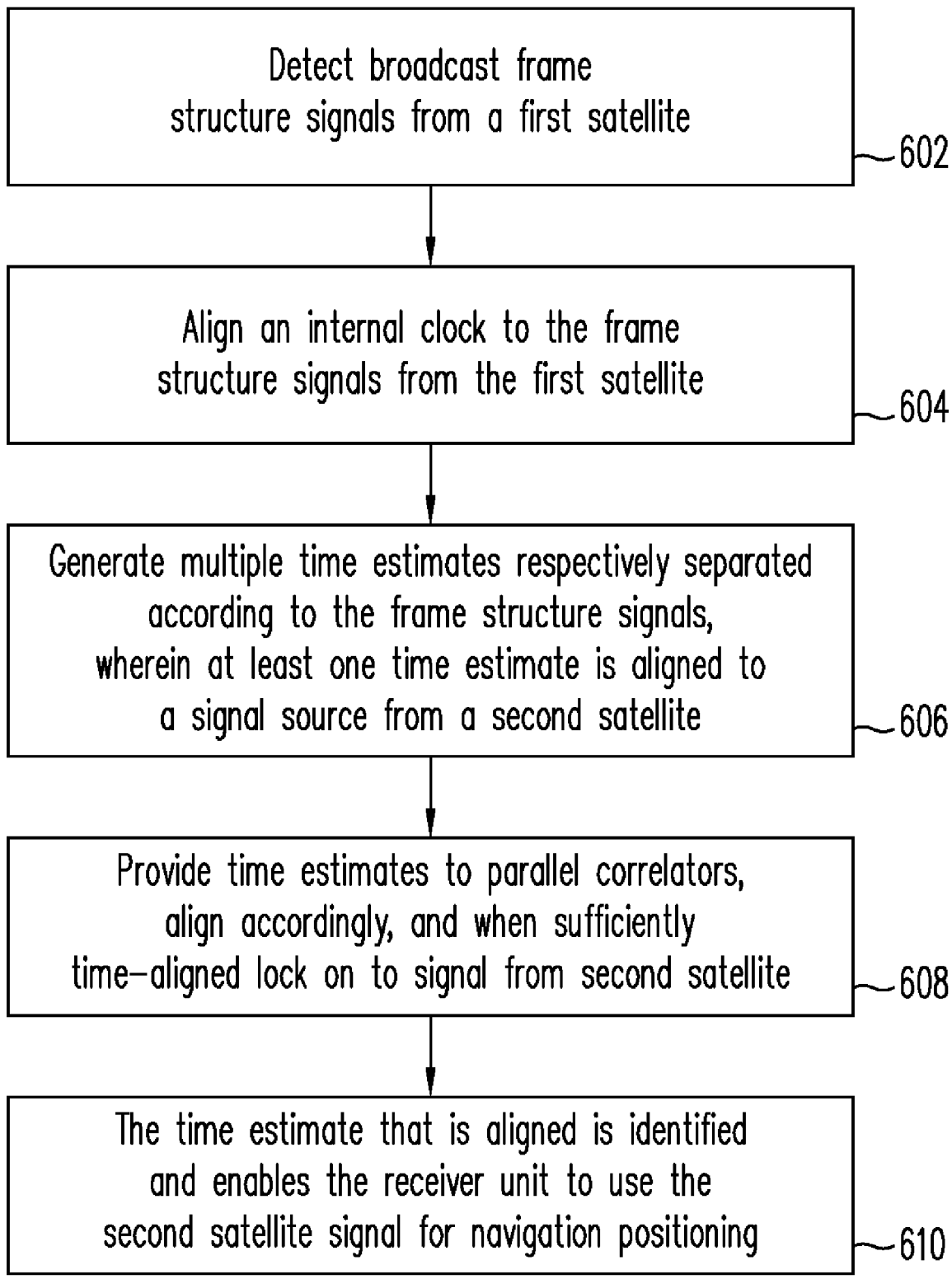
FIG. 6 is a flow chart illustrating a method of performing frequency transfer in attenuated or jammed environments according to an embodiment of the present invention.

FIG. 6 illustrates a method of transferring clock accuracy and stability for navigation in occluded (e.g., attenuated or jammed) environments according to an embodiment of the present invention. The method of FIG. 6 may be implemented with system 100 shown in FIG. 1, except that in this embodiment, it may be assumed that additional aiding information—such as that provided via network 108—is unavailable.

Using the method of FIG. 6, frequency calibration of a local oscillator of receiver unit 102 may be achieved in the absence of additional aiding information provided as described above by using, for example, the native L-band burst structure signal of an Iridium satellite. In various embodiments, satellite 104 may be a LEO satellite such as Iridium and satellite 106 may be a GPS satellite. In such embodiments, it is known that an Iridium satellite uses frequencies according to an L-band structure from 1610 MHz to 1625 MHz. GPS carriers are also in the L-band, centered at 1176.45 MHz (L5), 1227.60 MHz (L2), 1381.05 MHz (L3), and 1575.42 MHz (L1) frequencies. Because of the proximity between the Iridium and GPS frequencies, receiver unit 102 may be capable of receiving signals together from both satellite systems, Iridium and GPS satellite systems, without the need for an extra antenna. L-band signals provided by Iridium satellites may be tied to UTC time with a precision of approximately 10 microseconds. The L-band Iridium satellite signals are structured with 180 millisecond (0.18 sec) message frames. Thus, by determining the edges of L-band message frames of Iridium satellite signals, accurate timing information may be obtained.

At step 602, the broadcast frame structure of signal 105 (e.g., when implemented by L-band Iridium satellite signals) from satellite 104 may be detected by receiver unit 102. Even without a well-defined or refined code (e.g., time transfer structure messages), it is possible for receiver unit 102 to detect the L-band frame of the Iridium transmission signals. Because in this embodiment it is assumed that additional aiding information is unavailable from network 108, receiver unit 102 prepares successive guesses or estimates of absolute time, e.g., the "Time" term of equation (1). With sufficient prior knowledge the number of time estimates may often be bound by a reasonable number. For example, within 100 frames of the Iridium frame structure there is a GPS second that lines up. Thus, the number of time estimates or guesses may be limited to 100. Therefore, by simply knowing the frame edge of satellite 104, GPS processing may be significantly improved because of the reasonable bound (e.g., 100 per the present example) on the number of time estimates needed.

At step 604, after successive estimates are produced, a local clock of receiver unit 102 may be aligned to the frame structure of signal 105 of satellite 104, e.g., the first satellite. Alignment may be accomplished by using, for example, the phase error detected in the processed data of the demodulated time transfer structure signal. The phase error may be input to the phase locked loop process described previously to effect a frequency/time alignment between the frame structure of signal 105 and the local clock of receiver unit 102.

At step 606, multiple time estimates that are respectively separated according to the frame structure signals are generated so that at least one time estimate is aligned to signal 109 of satellite 106, e.g., the second satellite.

At step 608, the time estimates may be provided to parallel correlators of receiver unit 102. In this case, receiver unit 102 (e.g., a GPS receiver) may have numerous parallel positioning system correlators which, when sufficiently time-aligned may be able to lock on to signal 109 (e.g., a GPS signal) from satellite 106 (e.g., a GPS satellite) even in a jammed or attenuated environment. The parallel correlators may then be aligned according to the time estimates.

At step 610, the time estimate that is aligned to signal 109 of satellite 106 is identified and significantly improves the ability of receiver unit 102 to efficiently detect signal 109 of satellite 106. Receiver unit 102 may then use the signal from satellite 106 (e.g., a GPS satellite) for navigation and positioning, especially in occluded environments where the signal 109 would not otherwise be detectable.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, may be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A method of transferring frequency stability from a satellite to a device, the method comprising:
   receiving a signal from the satellite;
   determining a code phase from the satellite signal, wherein:
      the satellite is a low earth orbit (LEO) satellite having a clock frequency,
      the signal comprises a plurality of message frames each having an ordinal number, and at least one time transfer structure message having a unique pseudorandom code, and
      the code phase corresponds to the ordinal number of the message frame whose time transfer structure message is identified through its unique pseudorandom code;
   receiving aiding information; and
   calibrating a frequency of a local clock of the device to substantially synchronize the local clock frequency with the satellite clock frequency, wherein the calibrating comprises measuring a frequency of the satellite signal using the code phase and the aiding information.

2. The method of claim 1, wherein:
   the calibrating comprises correcting the local clock frequency to compensate for a Doppler shift associated with relative motion of the satellite and the device.

3. The method of claim 1, wherein the calibrating comprises:
   correcting the measured frequency of the satellite signal to compensate for a Doppler shift associated with relative motion of the satellite and the device;
   determining the satellite clock frequency; and
   generating a frequency correction for the local clock frequency using the satellite clock frequency and the corrected measured frequency of the satellite signal.

4. The method of claim 1, wherein:
   the satellite signal comprises a plurality of message frames, wherein each message frame comprises a time transfer structure message.

5. The method of claim 4, wherein:
   each message frame further comprises payload bits associated with communication data.

6. The method of claim 4, wherein:
   the determining the code phase comprises identifying a code that is unique for each of the time transfer structure messages of at least one of the message frames.

7. The method of claim 6, wherein:
   the code is a binary code having a code set, wherein cross-correlation between distinct members of the code set is relatively low and auto-correlation for each individual member of the code set is relatively high.

8. The method of claim 1, wherein:
   the aiding information comprises satellite orbit information.

9. The method of claim 1, further comprising:
   using the calibrated local clock frequency to lock onto a Global Positioning System (GPS) signal; and
   determining a position of the device using the GPS signal.

10. The method of claim 1, wherein:
    the calibrating comprises calculating a range rate from an orbital model of the LEO satellite and an approximate location of the device.

11. A receiver unit comprising:
    an antenna adapted to receive a signal from a satellite, wherein:
       the satellite is a low earth orbit (LEO) satellite having a clock frequency, and
       the signal comprises a plurality of message frames each having an ordinal number, and at least one time transfer structure message having a unique pseudorandom code;
    a local clock;
    an analog-to-digital (A/D) converter adapted to sample data from the time transfer structure message in the satellite signal;
    a memory adapted to store aiding information; and
    a computer adapted to determine a code phase using the sampled data, wherein:
       the code phase corresponds to the ordinal number of the message frame whose time transfer structure message is identified through its unique pseudorandom code, and
       the computer is further adapted to measure a frequency of the satellite signal using the code phase and the aiding information to determine a frequency correction for the local clock to substantially synchronize the local clock frequency with the clock frequency of the satellite.

12. The receiver unit of claim 11, wherein:
    the frequency correction includes a Doppler frequency correction to the measured frequency of the satellite signal to compensate for a Doppler shift associated with relative motion of the satellite and the receiver unit.

13. The receiver unit of claim 11, wherein:
    the aiding information comprises ephemeredes for the satellite orbit; and
    the aiding information comprises an approximate location of the receiver unit.

14. The receiver unit of claim 11, wherein:
    the time transfer structure message comprises a binary code having a code set, wherein cross-correlation between distinct members of the code set is relatively low, auto-correlation for each individual member of the code set is relatively high, and each member of the code set uniquely identifies a message frame of the time transfer structure message.

15. The receiver unit of claim 11, wherein:
    the identity of the message frame determines a code phase; and
    the aiding information includes a time slot offset and a distance from the satellite to the receiver unit.

* * * * *